Aug. 23, 1960  D. H. STAELIN  2,949,707
METHOD AND APPARATUS FOR GRINDING AND POLISHING SHEET GLASS
Filed Feb. 23, 1956  2 Sheets-Sheet 1

INVENTOR.
DAVID H. STAELIN
BY
*Staelin Overman*
ATTORNEYS

Aug. 23, 1960  D. H. STAELIN  2,949,707
METHOD AND APPARATUS FOR GRINDING AND POLISHING SHEET GLASS
Filed Feb. 23, 1956  2 Sheets-Sheet 2
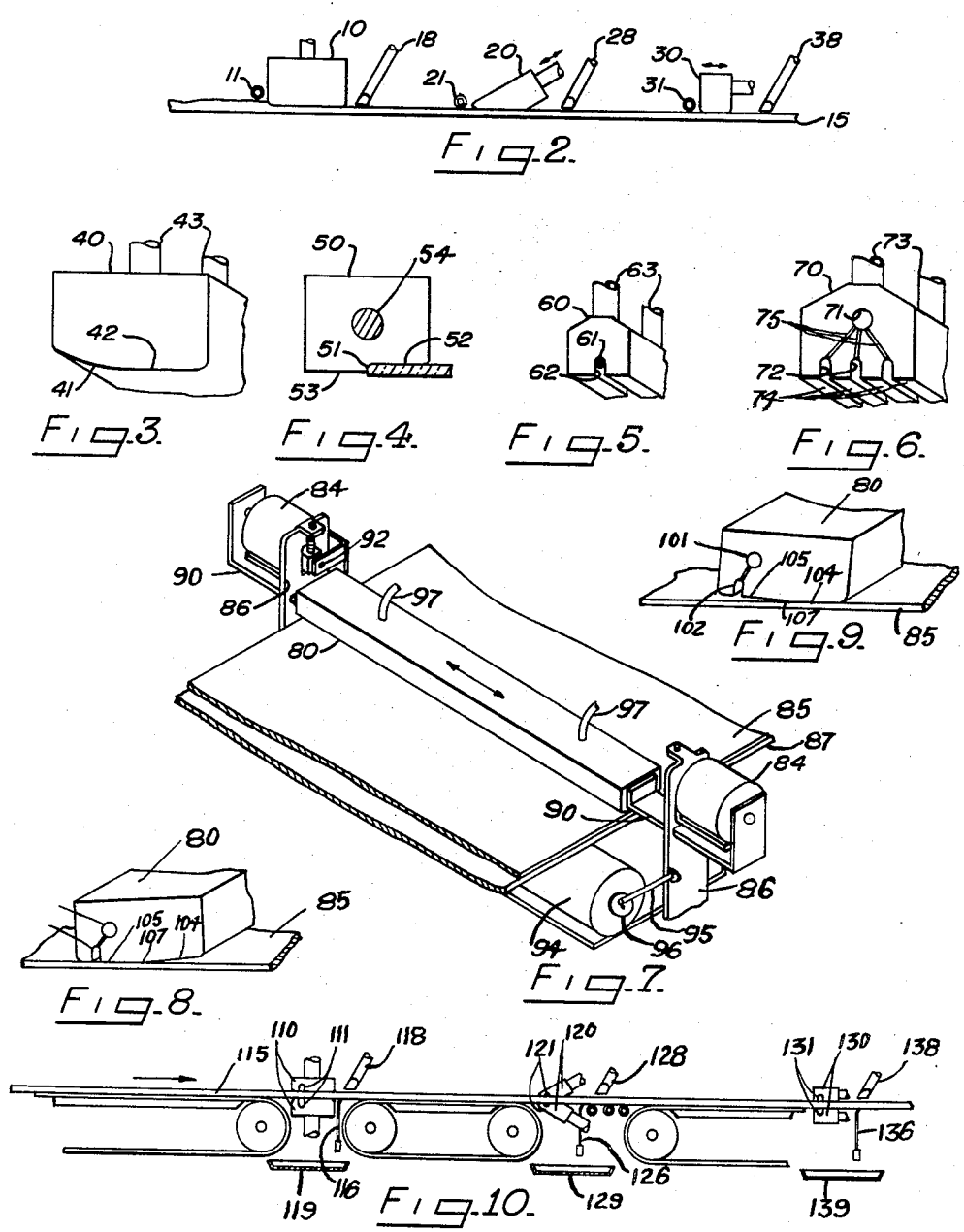
INVENTOR.
DAVID H. STAELIN
BY
ATTORNEYS United States Patent Office 2,949,707
Patented Aug. 23, 1960

2,949,707

METHOD AND APPARATUS FOR GRINDING AND POLISHING SHEET GLASS

David H. Staelin, 2385 Evergreen Road, Ottawa Hills, Ohio

Filed Feb. 23, 1956, Ser. No. 567,122

11 Claims. (Cl. 51—60)

This invention relates to a method and apparatus for grinding and polishing flat glass on a continuous production line basis and in particular to a method and apparatus adaptable to simultaneous and continuous grinding-polishing of two faces of a continuous ribbon or sheet of glass.

It is a principal object of the invention to provide more economical and a more effective method and means for grinding and/or polishing flat glass surfaces with precision on a continuous basis with a minimum of manual labor.

Considerable progress has occurred in recent years in the arts related to the working, cutting and drilling of hard materials to produce desired shapes. One area in which advancements have been made to a tremendous extent lies in the field of application of electrical transducers and more particularly high frequency electromechanical transducers for such purposes. As an example, the use of the principles of cavitation in conjunction with high frequency electromechanical transducers has enabled chipping and cutting of hard materials such as diamonds with much greater ease than heretofore possible and has enabled the contouring of such materials to forms heretofore never obtainable. It is a purpose of the present invention to apply high frequency transducer apparatus and the principles of cavitation in the art of polishing flat surfaces of glass in the form of continuous plates, sheets or ribbons.

Conventional methods of grinding and polishing glass surfaces usually involve application of abrasive action with disc-type apparatus having considerable limitation from the standpoint of cumbersomeness and adaptability to continuous production operations. The present invention, however, eliminates the need for rotary disc apparatus and provides a flexible method and means of grinding and polishing glass surfaces by agitation of abrasive material in liquid suspension by means of electromechanical transducer heads. The transducer equipment is operated in the frequency range of about 400 cycles per minute and above, in other words, in the range where the rate of agitation or working of the surface is such that the amplitude of the transducers need only be in the magnitude of a thousandth of an inch to effect removal of material. It has been found that transducer heads when used in conjunction with liquid suspended abrasives and when operated in high frequency ranges have tremendous surface cutting effects on surfaces toward which the heads are intimately directed since the abrasive material itself acts directly on the surface from which the material is removed and acts, in a sense, to chip away the material rather than abrade it.

By the present description, the invention involving surface removal of material is exemplified by a process which is, in a sense, a three-stage method where the surface is first preworked or chipped to effect a preflattening of the surfaces, whereafter an intermediate stage of working to a lesser degree of material removal is effected. In a final stage a minimum of material is removed and the glass surface is caused to flow into a polished form under limited pressure by a form of gentle horizontal rubbing with high frequency transducer means.

Other objects and features of the invention will appear as the description progresses. Referring now to the drawings:

Figure 2 is a somewhat schematic side-elevational view of the apparatus and method of Figure 1;

Figure 3 is an enlarged view in perspective of a type of working head utilized to perform functions in accordance with the principles of the present invention;

Figure 4 is an elevational view partially in cross section of an edge-polishing head adapted for use according to the present invention;

Figure 5 is another view in perspective of a different type of transducer head in which abrasive-containing fluids may be introduced directly and continuously under the working surface thereof;

Figure 6 is a view in perspective of still another transducer head of the present invention in which a plurality of cavities within the working surface are provided for introduction of abrasive-containing fluids between the working surface of the head and the surface to be worked;

Figure 7 is another arrangement of apparatus for treating surfaces of flat glass in accordance with this invention;

Figure 1:
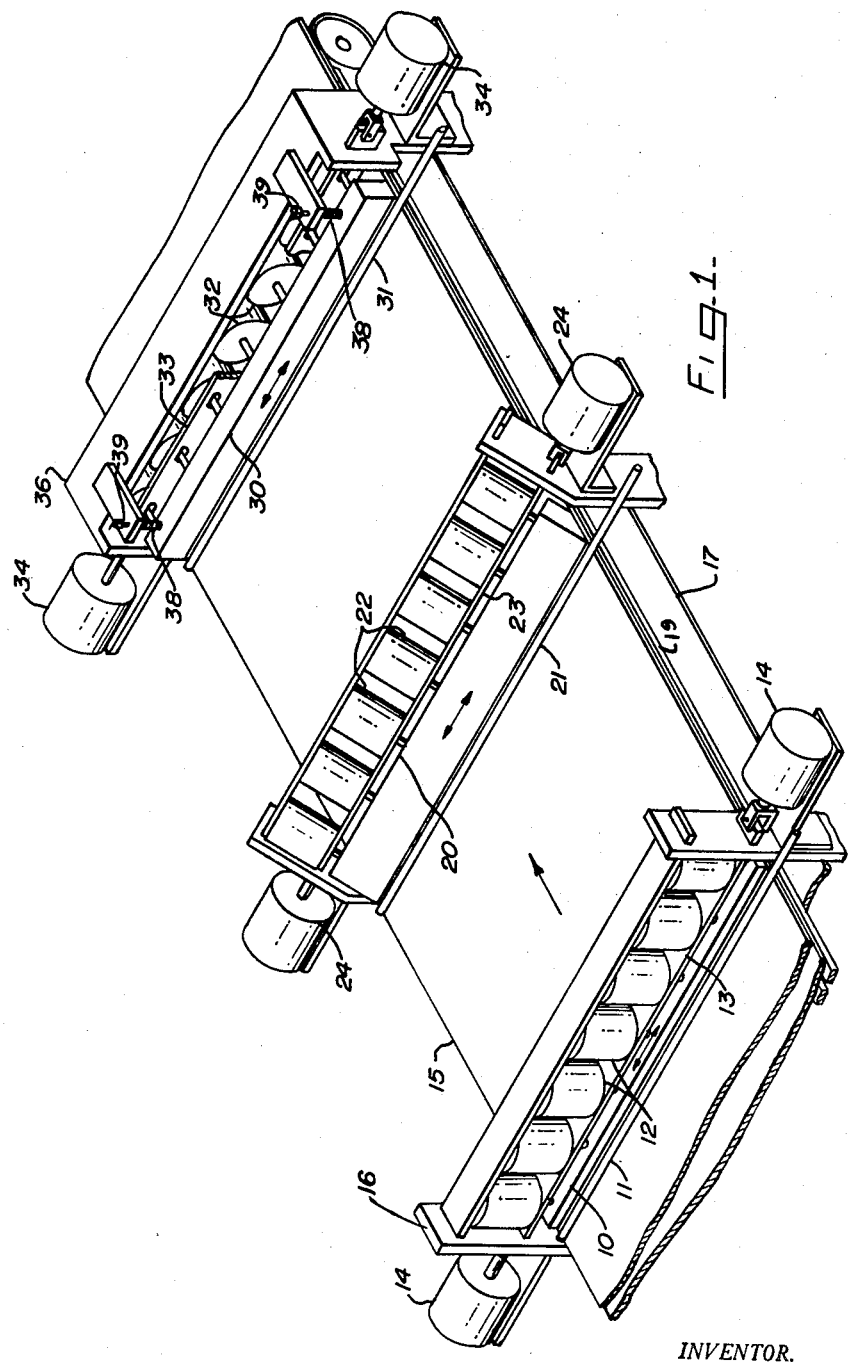
Figure 1 is a view in perspective of a section of a conveyor line for grinding-polishing a continuous ribbon of glass showing an arrangement of apparatus for treating the glass in accordance with the principles of the present invention.

Figures 8 and 9 are somewhat schematic side-elevational views showing details and two operational positions for the working head of the apparatus in Figure 7; and Figure 10 is a somewhat schematic side-elevational view of the arrangement of apparatus utilized in accordance with the present invention illustrating the manner in which opposite surfaces of a single flat ribbon, plate or sheet of glass may be worked simultaneously in a grinding-polishing operation.

Turning to the drawings in greater detail, Figure 1 shows a three-stage grinding-polishing operation in each stage of which a plurality of electromechanical transducers are utilized to vibrate a working head as the glass being worked is advanced continuously under the head. In each stage of the grinding-polishing operation, the working head extends across the continuous glass sheet 15 transversely to the direction of motion of the sheet and is pressed against the surface to be treated while a suspension of finely divided abrasive in an appropriate liquid is introduced under the head onto the glass surface being worked. The amplitude of vibration of each of the heads at the high frequencies employed is relatively small, being in the order of less than .05 inch and usually smaller than this magnitude. The amplitude is so small and the frequencies so high that movement of the working heads is not visible, but under the light continuous pressure applied, material is continuously removed.

In Figure 1 the apparatus is arranged to remove the greatest amount of material from the sheet glass advanced thereunder in the first stage where the surface being worked is the roughest. Progressively less material is removed from the surface being treated in the second and last stages of the grinding-polishing operation.

In the first stage, the working head 10 is arranged to be vibrated in a vertical direction by a plurality of transducer heads 12 supported in a framework 16. The heads 12 are so mounted in the housing or framework 16 that the working head 10 in addition to being vibratable in a vertical direction, can be oscillated in a horizontal direction by a pair of laterally disposed electromechanical transducers 14 disposed on opposite ends of the working head 10. The latter move the head 10 and the assembly of transducers 12 by way of a mechanical tie-in structure 13 which is slidably mounted in the framework 16 to permit the head 10 to be moved in a horizontal direction transverse to the direction of motion of the sheet material 15 carried on the conveyor 17. Means such as "T" rack members 19 below the conveyor provide support for the conveyor belt to assure positive level positioning of the glass sheet 15 upon passage under the heads in each stage of the operation.

The finely divided abrasive actuated by the head 10 is introduced to the face of the glass sheet 15 just behind the head 10 by way of a supply tube 11 extending across the width and just above the sheet 15. The tube 11 is provided with a series of apertures arranged to effect an even distribution of the abrasive material across the width of the sheet to be carried under the head 10 by motion of the sheet 15 in a direction under the head. As may be seen more clearly in Figure 2, the finely divided abrasive after being carried under the head 10 is substantially all removed on the forward edge of the head 10 by a suction tube 18 (Figure 2) to provide a relatively clean surface for subsequent treament by the second stage.

Figure 2 illustrates somewhat schematically the general over-all picture of the grinding-polishing operation and the apparatus utilized to effect such operation in the manner of Figure 1. This illustration shows the general location of the abrasive supply tubes 11, 21 and 31 with the heads 10, 20 and 30, respectively, and also the abrasive removal apparatus consisting of suction tubes 18, 28 and 38, respectively, which pick up the abrasive particles after use in each stage. The used abrasive particles recirculated in each stage for recirculation to the supply tubes in their respective stages, if desired.

It is believed that the working of the surface for removal of material therefrom is effected by the abrasive in liquid suspension and not by the tool. Since it is believed that the principle of cavitation is involved in this highly effective process of removing material, the liquid in which the abrasives are suspended should be selected from among those readily subject to cavitation such as water. It appears that the constant motion of the abrasive particles against the face of the glass sheet being worked results in each minute portion of the surface being impacted by abrasive particles. At the high frequencies desirably employed, the acceleration energy imparted to the liquid suspended abrasive particles is of such great magnitude that it appears that the particles actually effect a chipping or cutting away of minute particles of the surface. The working head 10 is made of tough material which is not of brittle character such as malleable metal. The abrasive introduced thereunder from the supply tube 11 may be supplied in a water suspension and after being used may be removed from the sheet surface by suction means such as a suction tube 18 from which it can be recirculated back to the supply tube 11.

In vibrating vertically the working head 10, in a sense, causes a digging into the surface of the sheet 15 by being supported from and driven by transducers mounted at a given level above the surface within the framework 16. Since the amplitude of vibration is fixed at an extremely small value, the digging action is correspondingly small in the order of approximately .05 inch or less. With such a vertical chipping away of the sheet 15, the roughest spots in such surface are ground away. Subsequent to such treatment, the surface is more uniform in character and in effect pretreated for subsequent more refined polishing operations.

The horizontal movement of the working head 10 by the transducers 14 is arranged to be variable in frequency to permit synchronization of the transverse horizontal frequency of vibration of the head 12 to its vibration in the vertical plane. If desired, however, the horizontal frequency of vibration by the transducers 14 may be different from the vibration generated by the heads 12 to provide a wide range of motions of the head 10 in the vertical plane transverse to the sheet 15. For example, motions in the vertical plane may correspond to a wide variety of Lissajous figures such as a figure either or ellipses may be imparted to the head 10, if desired. In this respect, it should be noted that as these complex motions are imparted to the head 10 within a vertical plane to effect a grinding of the surface of the sheet 15, the sheet is being continually advanced under the head 10. For this reason, the motions imparted to the particles driven against the surface by the head 10 are extremely complex but trajectories may be varied over a wide range to produce any of a range of prepolished conditions approaching smoothening of the surface from a rough surface condition.

Ths apparatus arrangement for surface treatment of the sheet 15 in the second stage of grinding and polishing includes a plurality of transducers 22 operated in unison in a manner similar to that of the first stage but are so associated with the head 20 of this stage that they drive the head in a direction diagonal to the surface of the sheet. As in the first stage, the transducers are tied together structurally to permit horizontal oscillation of the head 20 back and forth across the sheet 15. The transducer assembly and tie-in structure 23 is slidably mounted within the frame structure 26 so that the head 20 may be reciprocated in its horizontal direction while being dirven diagonally by the transducers 22. By reason of the fact that the head 20 is driven diagonally into the surface of the sheet, the full amplitude of vibration effected by the transducers 22 is diminished in a vertical direction and dependent upon the angle at which oscillation occurs with respect to the sheet surface. The smaller the angle of vibration with respect to the horizontal, the greater is the horizonal component of vibration and the smaller is the vertical component of vibration. Accordingly, for a given amplitude of vibration of the transducers and the head 20, a range of vertical components can be provided from which an optimum vertical amplitude may be selected to provide a second degree of grinding closer to a polish than is provided by the first stage of the grinding-polishing operation. The abrasive particles for the second stage of the grinding-polishing operation are provided by a supply tube 21 which drops the particles in liquid suspension on the surface of the sheet 15 immediately before the head 20, and after use the particles and liquid are picked up by means such as an arrangement of a suction tube 28 immediately behind the head 20. By reason of the fact that the sheet 15 is being advanced horizontally under the head 20 as the head is vibrated in a direction with a backward horizontal component of motion, a somewhat rotary flowing or couple action is exerted upon abrasives on the surface of the sheet by the head 20 and sheet 15 as the vertical component drives the abrasive particles into the sheet 15. The vertical component of vibration is proportional to the sine of the angle of vibration of the head 20 while the horizontal component thereof is proportional to the cosine of such angle.

After being subjected to the first and second stages of the grinding-polishing operation, the surface of the sheet 15 has been pretreated to a sufficient degree to permit a final polishing of the surface. This may be accomplished in the third stage of the grinding-polishing operation wherein the working head 30 is oscillated in two directions within the horizontal plane by two cooperating sets of transducers 32 and 34. The transducers 32 operate in unison to vibrate the head 30 in a horizontal direction parallel to the direction of advancement of the sheet 15 on the conveyor 17.

An assembly structure 33 ties the transducers 32 together as a group within a support frame structure 36 and is actuated by the pair of transducers 34 located on opposite sides of the support structure 36 to reciprocate the head 30 in a direction transverse to the direction of motion of the sheet 15. It will be recognized that by reason of the fact that the head 30 is movable in a forward and backward direction as well as a transverse direction, it can be imparted a circular or elliptical motion, or may be imparted other motions of non-linear form such as that which will outline a figure eight or a quadruple looped configuration depending on the relationship of the frequencies of vibration of the transducers 32 and 34.

The pressure of the head 30 on the surface of the sheet 15 is made adjustable by way of a variable compression spring 38 which bears against the top of the head 30 and is capable of being adjusted for various degrees of compression against the head by means of a set screw 39.

The abrasive particles in liquid suspension introduced under the head 30 are supplied from a tube 31 extending across the width of the conveyor 17. After passage under the head 30, the particles are picked up by means such as a suction tube 38 at the forward side of the third stage of the grinding-polishing operation. The horizontal oscillation of the head 30 according to the configurations indicated above, provide somewhat of a wiping action over the surface of the sheet 15 which causes the glass surface to take on a smooth planar form. At each successive stage of the three-stage operation, the abrasive particles introduced to the glass surface may be progressively finer in each stage such that in the final or third stage, the abrasive material is extremely fine to provide a lapping action more than a grinding action. An abrasive material which may be used for these purposes is boron carbide. Other materials which may also be employed are aluminum oxide, silicon carbide and similar materials.

Figure 3 illustrates a type of working head 40 which may be utilized in the first stage of the polishing-grinding operation which is shaped to assure a positive flow of abrasive fluid to the under surface of the head. To facilitate such flow, the rearward position 41 of the under surface is inclined downwardly along an arcuate line toward the central part of the head and blends into the more horizontal portion 42 at the forward part of the head. The head is vibrated in a direction generally perpendicular to its under surfaces by transducers connected to the head by way of members 43.

Flow of abrasive particles thereunder is effected by introducing them behind the head 40 by means such as the abrasive supply tube 11 of Figures 1 and 2, and the forward advancement of the glass sheet on which the abrasive particles are deposited carries them under the rearward edge and causes a wedging of the particles between the head and the sheet surface as they approach the more flat position 42. The vertical vibratory action of the head 40 then actuates the particles to drive them against the sheet surface.

It should be noted that although adjustable pressure means are illustrated for varying the pressure of the head 30 against the sheet 15 in the third stage of the grinding-polishing operation, similar varying pressure means are adaptable to incorporation in the first and second stages of the operation. In this respect, pressure-adjusting compression spring arrangements associated with set screws, although not shown, can be inserted between the tie-in member 13 and the head 10 in the first stage, as well as between the tie-in member 13 and the head structure 20 in the second stage. The transducers 12 and 22, respectively, are thus arranged to operate against compression springs which are adjustable to provide the surface of the sheet 15 and correspondingly to provide the optimum of operating conditions due to pressure of the heads against the surface of the sheet 15.

Figure 4 illustrates still another type of working head 50 which may be used more particularly to polish and shape the edges of a sheet of glass. This head is adapted for vibration by a transducer actuated member 53 which moves the head in a horizontal direction generally parallel to the rough edge of the sheet to be worked. The head has an under surface consisting of two generally horizontal flat positions 52 and 53 having a bridging or connecting surface portion 51 therebetween. The surface 51 extending between the vertically spaced surfaces 52 and 53 may be substantially vertical to impart a square edge to the sheet 55, as illustrated, but it will be understood that various shapes may be given to the under side or working surfaces of the head such as by way of example, shapes which will provide beveled or curved edges for the glass sheet.

Abrasive particles in liquid suspension may be introduced under the head 50 by providing a raised rearward edge as in the manner of the structure in Figure 3 which will permit introduction of abrasive particles under the head by being carried forward by the advancement of the glass in the direction under the head 50. Vibration of the head 50 is usually arranged to be in a direction generally parallel to the surface being polished but may be vibrated in a direction perpendicular to the surface being treated, under which circumstances, if the head is arranged to overlap and sufficiently overhang such edge, such as the edge of the sheet 55, it can be made to trim off the excess portions while, at the same time, treating the edges for the polishing operation. Under some circumstances, however, it may be desirable to vibrate the head in a direction diagonally toward a corner of the sheet 55 to provide horizontal components of force which will operate on vertically oriented portions of the sheet 55 for a more positive polish of the edge while still other conditions might dictate that the head be alternately oscillated along the edge of the sheet and diagonally thereagainst.

Figure 5 and Figure 6 illustrate two different but somewhat similar types of working heads 60 and 70, respectively, having longitudinal groove-type cavities on their under surfaces extending along the dimension transverse to the sheet glass being worked.

In Figure 5, the head 60 is actuated by members 63 connected to transducers, not shown, and has a groove-type cavity 62 which extends along the length of the under side of the head 60. The cavity has a longitudinal tube 61 recessed in the upper portion thereof from which abrasive particles in liquid suspension are fed to the under side of the head as it is being vibrated. The tube 61 has spaced apertures along its length sufficiently close to each other to introduce the liquid suspended abrasive particles uniformly along the under side of the head across the width of the sheet to be treated.

The structural form of the head 70 illustrated by Figure 6 is somewhat similar to the head 60 of Figure 5 in that it is vibratably actuated by a series of members 73 connected to driving transducers, not shown, and has longitudinal groove-type cavities 72 thereunder which extend along the length of the under side of the head. Each of the groove-type cavities of this structure, however, instead of being supplied with abrasive particles from tubes recessed within the cavities are supplied from a common tubular channel 71 centrally located within the interior of the head 70 and has connecting channels 75 extending to the cavities to feed liquid suspended abrasive particles thereto. A plurality of the connecting channels 75 extend to each of the longitudinal cavities 72 and are spaced from each other to provide an even distribution of abrasive particles along the length of each of the cavities.

As the head 70 is vibrated in a vertical direction, the particles flowing from the cavities are introduced under the flat surfaces 74 at the rearward edge of each of the cavities and are driven into the surface of the glass in a manner similar to operation of the non-grooved heads. The particles subjected to the forces of heads of this type, however, are more free to be agitated and are more uniformly distributed across the length and the width of the under part of the head 70. Thus, the efficiency of the working action of the head 70 on the surface of the sheet to be treated is somewhat better than that under heads having no supply cavity or only a single abrasive supply cavity thereunder.

In both the heads of Figure 5 and Figure 6, the supply of abrasive in liquid suspension can be suitably provided from an external source connected by way of one or more flexible hoses or tubes to the ends of the tube 61 in the first instance or to the ends or more central portions of channels 71 in the second. Excesses or used abrasives on the surface of the glass worked may be removed by means similar to the suction tube arrangement exemplified in the schematic diagram of Figure 2.

Another arrangement whereby transducer-actuated working heads may be utilized to surface treat or grind and polish glass surfaces is illustrated in Figure 7. In this arrangement a head 80 extending across the width of a sheet advanced thereunder is oscillated at a high vibratory rate across the width of the sheet as it is rocked over the surface at a lower frequency rate. The longitudinal head 80 extending across the surface and width of the sheet 85 is supported and driven by a pair of slidable members 90 which extend through a pair of suspended head support members 86 located on opposite sides of the conveyor 87 carrying the sheet 85. The two support members 86 each have a transducer 84 associated therewith arranged for transverse horizontal oscillation of the head 80. The members are suspended from, and arranged to be rocked about, pivot members 92 located above the sheet 85 by a motor 84.

The motor is connected to one of the members 86 by an eccentrically driven connecting arm 95 pivotably secured to the bottom portion of the member 86. At the end toward the motor 94, the arm 95 is connected eccentrically to a driven pulley 96.

Suspension of the members 86 from the pivot members 92 is made adjustable to permit raising and lowering of the head 80 to different levels for various selectable degrees of working of the surface of the sheet 85. Oscillation of the head 80 across the width of the sheet 85 is effected at relatively high vibratory rates above 400 cycles a second, whereas the rocking action is effected at a slower rate in the order of 100 cycles a second or less. The rocking action, however, is arranged to be sufficient in rate that substantially all portions of the surface of the glass are engaged and in effect rubbed transversely under the influence of the head 80. Abrasive fluid is supplied to the head 80 by tubular means such as a pair of hoses 97 connected from an abrasive supply source to openings at the top of the head and leading to an internal channel 102.

Figure 8 and Figure 9 each show two different positions of the type of head 80 which may be used in the assembly of apparatus of Figure 7. The under surface of the head is composed of two adjacent substantially flat portions 104 and 105 oriented at a slight angle to each other. The rearward flat surface portion 105 is provided with a groove-type cavity 102 which extends along the length of the head 80 and is connected to the abrasive supply channel 101 extending through the interior of the head in the manner similar to the arrangement of Figure 6. In the head of Figures 8 and 9, however, the abrasive supply channel is connected with a cavity located toward the rearward edge of the head 80 so that the particles introduced therefrom will have a greater horizontal distance of effectiveness before being released from influence of the vibratory action of the head 80. The forward under portion of the head 80 is provided with a substantially flat surface portion 104 of greater dimension across the width of the head than the rearward flat surface portion 105.

As the head 80 is rocked about its pivot members 92, engagement of the surface of the sheet 85 is alternated between the surfaces 104 and 105. The two surfaces are joined by a relatively short arcuately contoured portion 107. While being rocked, it is desirable, however, that the surface portions 104 and 105 each make contact with the glass surface for a longer period of time than the portion 107 in order to work the glass surface 85 most effectively. This is accomplished by suitably connecting the arm 95 to the pulley 96 in such manner that the head 80 is rocked more rapidly during the time the head 80 is resting on the intermediate portion 107 on the under surface of the head. Thus, as each of the flat surface portions 104 and 105 makes contact with the glass surface, it is effective in producing a polishing action by reason of the high rate of oscillation of the head 80 in a horizontal direction. The flow of abrasives from channel 102 is arranged to be constant so that abrasives exist under the head 80 at all times regardless of which of the flat bottom portions of the head, rearward or forward, is in engagement with the surface to be treated.

Figure 10 is a schematic side-elevational view of a series of three transducer-actuated working heads for treating two sides of a glass sheet simultaneously. The grinding-polishing operation in this arrangement is effected in a manner similar to that of Figures 1 and 2 with the exception that a pair of vibrating working heads on opposite sides of the sheet 115 in each stage are vibrationally actuated to effect a polishing thereof. In the first stage, heads 110 actuated by suitable transducers not shown are vibrated in a vertical direction and are supplied with liquid-suspended abrasive particles from longitudinal cavities 111 in the rearward edge of each of the heads.

Subsequent to use, the abrasive particles in this stage are removed by way of a suction tube 118 on the top surface, whereas at the bottom surface the used abrasive is removed by a wiper 116 and dropped to a pan 119 located below the working zone. In both instances the abrasive material may be recirculated for reintroduction onto the heads 110 by way of their respective supply cavities 111. Abrasive-containing fluid fed from the bottom head 110 is supplied under pressure to assure positive flow of the abrasive between the head and bottom surface of the sheet 115.

The second stage of the grinding-polishing operation is again similar to that of the arrangement of Figures 1 and 2 with the heads 120 being driven diagonally into the opposite surfaces of the sheet 115. Fluid suspended abrasive particles are supplied to positions under the heads by way of cavities 121. Abrasive used on the top surface is removed by a suction tube 128 subsequent to advancement under the head and the used abrasive in the bottom surface of the sheet is removed by a wiper 126 and deposited in a pan 129. In the third stage the final action on the two surfaces of the glass are effected by horizontally oscillated heads 130 which are also supplied with abrasive particles in liquid suspension from grooves 131. Again, the used abrasive on the top surface of the sheet is removed by the suction tube 138 whereas used abrasive on the bottom surface is removed by a wiper 136 and is deposited in the pan 139.

Although there has been described herein what are considered the preferred embodiments of the invention, various modifications will be apparent to those skilled in the art. For example, although the grinding-polishing in the present description have been related, and are preferably accomplished with the working heads vibrating at high frequencies, it will be understood that the structure and operation in the various stages would also be effective at low frequencies.

Still further, it will be understood that the transducer arrangements herein disclosed may be modified such as by making the length of the transducer heads extending across the width of sheets contacted only a portion of the total width, and arranging for a sweeping oscillation across the full width of the sheet. It is, therefore, my desire that the appended claims shall cover all modifications and arrangements which come within the scope and spirit of my invention.

I claim:

1. The method of treating a sheet of glass and like material for a polish comprising advancing a sheet of glass under an electromechanical tool member extending across a surface of the sheet transverse to the direction of advancement of the sheet and in contacting relationship therewith, interposing between the tool member and the sheet a liquid suspension of finely comminuted abrasive, oscillating said electromechanical tool member at an ultrasonic frequency in a direction transverse to the direction of advancement of said sheet, and simultaneously oscillating said tool member against said surface at relatively the same high frequency and small amplitude with a component of movement perpendicular to said surface such as will effect removal of material from said surface.

2. The method of treating a sheet of glass and like material for a polish comprising continuously advancing a sheet of glass under an electromechanical tool member extending across a surface of the sheet transverse to the direction of advancement of the sheet, interposing between the tool member and the sheet a liquid suspension of finely comminuted abrasive, oscillating said tool member electromechanically at an ultrasonic frequency in a direction transverse to the direction of advancement of said sheet, and simultaneously oscillating said tool member continuously at relatively the same high frequency and low amplitude against said surface in a direction having components of motion parallel and diagonal to the direction of advancement of said sheet, at a relative frequency and amplitude from a fixed level above the bottom of said sheet to effect removal of material from said surface to a predetermined thickness of said sheet.

3. The method of treating a sheet of glass and like material for a polish comprising continuously advancing a sheet of glass under an electromechanical tool member extending across a surface of the sheet transverse to the direction of advancement of the sheet, interposing between the tool member and the sheet a liquid suspension of finely comminuted abrasive, oscillating said tool member electromechanically at an ultrasonic frequency in a direction transverse to the direction of advancement of said sheet, and simultaneously rocking said tool member continuously at a relatively lower frequency over said surface about a pivot point spaced from said surface in a direction perpendicular to the surface.

4. Apparatus for treating a surface of a sheet of hard, substantially non-yielding materials such as glass for a polish comprising a longitudinal tool member extending across the surface of a sheet of the material, means for advancing the sheet under the tool member in a direction transverse to the longitudinal orientation of said tool member, electromechanical transducer means for vibrating said tool member ultrasonically in a direction perpendicular to the surface across which it extends, means for interposing a liquid suspension of comminuted abrasive between said sheet surface and said tool member, said transducer means being so constructed that when operated in its normal intended manner, the relative vibration between the tool member and sheet surface are at an ultrasonic frequency such that with a small amplitude, the tool member drives the abrasive particles suspended in liquid under the tool member against the sheet surface, and electromechanical means for oscillating said member longitudinally across said sheet surface at substantially the same high frequency and small amplitude simultaneously with its vibration ultrasonically in the perpendicular direction.

5. Apparatus for treating a surface of a sheet of hard, substantially non-yielding materials such as glass for a polish comprising a longitudinal tool member extending across the surface of a sheet of the material, means for advancing the sheet under the tool member in a direction transverse to the longitudinal orientation of said tool member, electromechanical transducer means for vibrating said tool member ultrasonically in directions diagonal to and transversely across the surface across which it extends, and means for interposing a liquid suspension of comminuted abrasive between said sheet surface and said tool member, said electromechanical transducer means being so constructed that when operated in its normal intended manner, the relative vibration between the tool member and sheet surface is at an ultrasonic frequency such that with a small amplitude, the tool member drives the abrasive particles suspended in liquid under the tool member against the sheet surface to remove material from the surface.

6. Apparatus for treating a surface of a sheet of hard, substantially non-yielding materials such as glass for a polish comprising a longitudinal tool member extending across the surface of a sheet of the material, means for advancing the sheet under the tool member in a direction transverse to the longitudinal orientation of said tool member, means for biasing said tool member against said surface, electromechanical transducer means for vibrating said tool member ultrasonically in a direction parallel to the general orientation of the sheet and direction of advancement of the sheet, separate electromechanical means for vibrating said member longitudinally across said sheet surface ultrasonically simultaneously with vibration parallel to the direction of advancement of the sheet, and means for interposing a liquid suspension of comminuted abrasive between said sheet surface and said tool member.

7. Apparatus for treating a surface of a sheet of hard, substantially non-yielding materials such as glass for a polish comprising a longitudinal tool member extending across the surface of a sheet of the material, means for continuously advancing the sheet under the tool member in a direction transverse to the longitudinal orientation of said tool member, electromechanical means for oscillating said tool member at a given ultrasonic frequency longitudinally across said sheet, means for rocking said tool continuously at a relatively lower frequency against said surface about a pivot spaced a perpendicular distance from said surface, and means for interposing a liquid suspension of comminuted abrasive between said sheet surface and said tool member.

8. A multiple stage arrangement of apparatus for treating surfaces of a sheet of hard, substantially non-yielding materials such as glass for a polish comprising three longitudinal tool members extending generally parallel to each other across the surface of a sheet of the material, means for continuously advancing the sheet under the tool members in a direction transverse to their longitudinal orientation, means for interposing a liquid suspension of comminuted abrasive between said sheet surface and each of said tool members, electromechanical transducer means associated with said tool members for ultrasonic vibration of each against said surface, the first one of such members being arranged for ultrasonic vibration in a direction perpendicular to the surface, the following of said members being arranged for ultrasonic vibration in a direction diagonal to the surface, while the remaining member is biased against said surface and arranged to be ultrasonically vibrated in a direction parallel to the direction of advancement of the sheet.

9. A multiple stage arrangement of apparatus like that of claim 8 in which each of the electromechanical tool members is provided with means for oscillating the respective members ultrasonically longitudinally across said sheet surface simultaneously with its vibration against said surface.

10. Apparatus for treating a surface of a sheet of hard, substantially non-yielding materials such as glass for a polish comprising a longitudinal tool member extending across the surface of a sheet of the material, means for advancing the sheet under the tool member in a direction transverse to the longitudinal orientation of said tool member, electromechanical transducer means for vibrating said tool member transversely across said sheet as well as in a direction diagonal to the surface across which it extends, said transducer means being effective to vibrate said tool member at ultrasonic frequencies in both said directions, means for selectively fixing the pressure of said tool member against said sheet surface, and means for interposing under pressure a liquid suspension of comminuted abrasive between said sheet surface and said tool member, said electromechanical transducer means being so constructed that when operated in its normal intended manner, the relative vibration between the tool member and sheet surface are at an ultrasonic frequency such that with a small amplitude, the tool member drives the abrasive particles suspended in liquid under the tool member against the sheet surface to remove material from the surface.

11. Apparatus for treating a surface of a sheet of hard, substantially non-yielding materials such as glass for a polish comprising a longitudinal tool member extending across the surface of a sheet of the material, means for continuously advancing the sheet under the tool member in a direction transverse to the longitudinal orientation of said tool member, electromechanical means for oscillating said tool member at a given ultrasonic frequency longitudinally across said sheet, means for rocking said tool continuously at a relatively lower frequency against said surface about a pivot axis spaced a perpendicular distance from said surface and across said sheet, and means for interposing a liquid suspension of comminuted abrasive between said sheet surface and said tool member, said tool member having a contoured surface comprising two angularly related planar portions arranged to alternately engage said sheet in intimate relationship as said tool member is rocked, said means for interposing the abrasive between said head and sheet being located in the one of said planar portions closest to the side of said head from which said sheet is advanced.

References Cited in the file of this patent

UNITED STATES PATENTS

| | | |
|---|---|---|
| 2,070,944 | Hillix | Feb. 16, 1937 |
| 2,504,831 | Griss | Apr. 18, 1950 |
| 2,580,716 | Balamuth | Jan. 1, 1952 |
| 2,662,350 | Laverdisse | Dec. 15, 1953 |
| 2,736,144 | Thatcher | Feb. 28, 1956 |
| 2,787,100 | Peyches | Apr. 2, 1957 |
| 2,854,795 | McCown | Oct. 7, 1958 |